July 19, 1966 G. T. R. CAMPBELL ETAL 3,261,591
AUTOMATIC SELF-TENSIONING WINCH
Filed Nov. 29, 1963 6 Sheets-Sheet 1

INVENTORS
G. T. R. CAMPBELL
N. V. LASKEY
Fethustonhaugh & Co
ATTORNEYS

INVENTORS
G.T.R. CAMPBELL
N.V. LASKEY
Fetherstonhaugh & Co.
ATTORNEYS

Fig. 9  TAKE-UP

Fig. 10  NEUTRAL

INVENTORS
G.T.R. CAMPBELL
N.V. LASKEY
Fetherstonhaugh & Co.
ATTORNEYS

Fig. 11 — PAY OUT

Fig. 12 — HAULING IN

INVENTORS
G.T.R. CAMPBELL
N.V. LASKEY
Fetherstonhaugh & Co
ATTORNEYS

Fig.13

PAY OUT

Fig.14

NEUTRAL

INVENTORS
G.T.R. CAMPBELL
N.V. LASKEY

United States Patent Office 3,261,591
Patented July 19, 1966

3,261,591
AUTOMATIC SELF-TENSIONING WINCH
George T. R. Campbell, Montreal, Quebec, and Norman V. Laskey, St. Lambert, Quebec, Canada, assignors to Algonquin Shipping and Trading Limited, Montreal, Quebec, Canada
Filed Nov. 29, 1963, Ser. No. 326,799
Claims priority, application Canada, Aug. 29, 1963, 883,468
17 Claims. (Cl. 254—172)

This invention relates to ship's deck machinery and particularly with the mechanical drive between the prime mover and the haulage element viz barrel, drum, capstan, anchor cable lifter etc. on cargo winches, mooring winches, automatic self-tensioning mooring winches, bow and stern windlasses, trawl winches, hydrographic winches and oceanographic winches.

The present day methods of engineering the drive referred to above on marine deck machinery are as under-noted:

(1) Steam reciprocating engine of the non-condensing, reversible type in association with worm gear speed reducers or spur, helical or double helical gear trains interposed between the prime mover and the haulage element dependent on the torque and speed of rotation which has to be developed by this element.

(2) Reversing steam turbine of the non-condensing type in association with worm gear speed reducers and spur, helical or double helical gear trains interposed between the prime mover and the haulage element dependent on the torque and speed of rotation which has to be developed by this element.

(3) Uni-directional internal combustion engines of the gasoline or diesel type in association with a clutch, reversing gear box and a further extraneous train or spur, helical or double helical gears interposed between the prime mover and the haulage element dependent on the torque and speed of rotation which has to be developed by this element.

(4) Reversible direct current electric motor in association with worm gear speed reducer and spur, helical or double helical gear trains interposed between the prime mover and the haulage element dependent on the torque and speed of rotation which has to be developed by this element.

(5) Non-reversing alternating current electric motor, coupled to a direct current generator used to power a direct current motor. Close control of the D.C. generator and motor field currents produce the desired speed and power control which is unobtainable with the A.C. motor. This control system is known as the Ward Leonard System. The D.C. motor with this control system is used in association with double helical gear trains interposed between the prime mover and the haulage element dependent on the torque and speed of rotation to be developed by this element.

(6) Multiple speed viz wound rotor or pole changing, reversing alternating current electric motor used in association with a worm speed reduced and spur, helical or double helical gear trains interposed between the prime mover and the haulage element dependent on the torque and speed of rotation to be developed by this element.

(7) Uni-directional, constant speed alternating current or direct current electric motor driving a hydraulic pump which in turn powers a reversible hydraulic motor. This motor is used in association with a worm speed reducer and spur, helical or double helical gear trains interposed between the prime mover and the haulage element, dependent on the torque and speed of rotation to be developed by this element.

In the past decade there has been a trend which still continues in regard to the general adoption of generating alternating current on board ships instead of direct current which, up to this time, was a standard for marine electric power generation. The reason for this is not far to seek as alternating current generation, distribution and conversion has proved to be more economical from an installation and manitenance stand-point. There was sufficient practical evidence of this in land based electric power installations which had already adopted the alternating current system of electric power generation, distribution and conversion to justify its adoption on ships.

However the large scale adoption of alternating current generation today on ships has produced a number of problems for the designers and builders of deck machinery viz cargo winches, mooring winches, trawl winches, capstans, windlasses, etc. as the A.C. electric motor is not very suitable for this service even when a gear train is interposed between it and the haulage element. This has been a very large barrier in the development of a straight A.C. drive for deck machinery and has resulted in the employment of the Ward Leonard Control System which is in essence an indirect type of drive. In this system as already stated an A.C. motor is used to drive a D.C. generator which in turn powers a D.C. motor.

Another indirect drive which has come to the forefront in recent years owing to the problem of reversing and providing speed control for an A.C. motor over a wide range is the electro hydraulic drive. With this arrangement, a uni-directional A.C. motor drives a hydraulic pump which in turn powers a reversible hydraulic motor. Speed and power control on the haulage element is obtained by providing a constant pressure, variable displacement hydraulic pump or alternatively by allowing the full output of the pump, which remains constant, to be judiciously diverted from the hydraulic motor in order to obtain the desired speed and power control.

In the last five years, direct A.C. drives for shipboard deck machinery have become available but for the present it is limited to relatively small powers besides which the cost is comparatively high and maintenance of the preponderance of switch gear poses a threat to large scale adoption of this drive. It is for this reason that shipowners today still prefer to use the Ward Leonard or the electro hydraulic drive for deck machinery. At this junction it would be pertinent to enquire why more frequent or if not, the general adoption of steam deck machinery has not come about owing to the disadvantage of the A.C. motor. There are two very good reasons why steam deck machinery of the turbine or reciprocating type have not gained in popularity. They are as under-noted:

(1) The diesel engine when used for ship propulsion today enjoys the confidence of many shipowners besides which it offers them an operational advantage over vessels propelled by steam. The reason for this is because the specific fuel consumption of the modern highly supercharged diesel engine of the two cycle type is considerably lower and more-so today as it can operate successfully on the cheaper grades of fuels. This has resulted in its large scale adoption but as the steam generating capacity of a motor vessel is generally so low it has precluded the adoption of steam deck machinery. It would not be economically possible to provide steam deck machinery.

(2) In diesel propelled oil tank vessels, the problem is slightly different as a steam boiler of fairly large capacity has to be installed for cargo oil tank heating services and for heating sea water for washing the cargo tanks. On such vessels, steam deck machinery is justifiable but even so, the size of the boiler has to be greatly increased as the non-condensing reciprocating steam engine or steam turbine consumes an inordinately large amount of steam per horsepower developed. This makes for poor economy, heavy maintenance and generally speaking the use of steam deck machinery even in vessels propelled by steam is difficult to justify.

The invention, as applied to a self-tensioning mooring winch consists essentially of a simple uni-directional A.C. electric motor drive through a torque converter-clutch mechanism and an epicyclic gear train, drivably connected to the warping head of the winch. The wire rope barrel of the winch is rotatably mounted on the drive shaft connecting the spur and epicyclic gear trains with the warping head and the epicyclic gear train has its planetary pinions connected on one side with a ring gear on the wire rope barrel and on the other side with a gear wheel mounted on the shaft connecting the epicyclic gear train with the warping head. The torque converter clutch mechanism includes an epicyclic gear train which is of the three speed, reversible type which, in association with oil operated clutches, enables three speeds of clockwise rotation and correspondingly three speeds of counter clockwise rotation to be obtained. The spur gear train may be either single or double gear train. In this form of winch a speed increasing drive is effected in the first train of the epicyclic gearing, provided the gear case is not allowed to rotate on its bearings, the speed increase is reduced by an equal amount in the second gear train of the epicyclic gearing. The net result is that no speed reduction or increase occurs with this epicyclic gear train within its case. The main object of introducing this epicyclic gear train is to provide a measuring device for the tension in the wire rope in an automatic self-tensioning winch. An oil pressure operated multi-cone disc brake is mounted in the gear case of the spur gear train and serves to lock the spur and epicyclic gearing in their gear case when this clutch is engaged. A lever and pawl are provided to lock the wire rope barrel and epicyclic gearing when desired. The tension on the mooring rope is controlled by hydraulic pressure acting in a cylinder and piston device coupled to the gear case of the epicyclic gear train.

The invention as applied to a windlass is essentially the same as that above described except that a uni-directional squirrel cage A.C. electric motor is used to power the windlass through a torque converter/reverse reduction gear box. The output side of the torque converter/reverse reduction gear is connected to a double spur gear train driving the main shaft to which the warping head is attached. The cable lifter is rotatably mounted on the main shaft and is connected to the main shaft through an epicyclic gear train and can be locked with the gear case of the spur gear train, if desired. The multi-cone disc brake is mounted in the gear case of the spur gear train. A hydraulic cylinder and piston drive is connected to the gear case of the epicyclic gearing and acts as a shock absorber in order to relieve the gear trains throughout the drive in the windlass from shock when the multi-cone disc brake is applied. A cable lifter locking pawl is provided and is used to secure the cable lifter when the warping head is required for other uses while the cable lifter is used for anchoring purposes. In order to operate the warping head independently under this latter condition, the pin, used for connecting the hydraulic cylinder and piston device to the gear case of the epicyclic gearing, is removed, after which the warping head is free to be operated in either direction quite independent of the cable lifter.

In both the mooring winch and windlass installations above mentioned, hydraulic controls are used to control all phases of operation.

The object of the invention is to provide an A.C. electric drive for deck machinery which will operate smoothly and efficiently under the most severe operating conditions.

A further object of the invention is to provide an A.C. electric drive for deck machinery which includes a torque converter and an epicyclic gear train in association with oil operated clutches enable three speeds of clockwise rotation and corresponding three speeds of counter clockwise rotation to be obtained.

A further object of the invention is to provide a drive for deck machinery which will have self-tensioning characteristics relieving the drive of severe shocks which are inherent in the operation of most deck machinery.

A further object of the invention is to provide a drive for deck machinery in which a warping head on the machine can be driven independently of the machine's wire rope barrel or cable lifter.

A further object of the invention is to provide a degree of self-tensioning in deck machinery which will reduce wear and tear on the machinery and on the wires and cables controlled by the machines.

A further object of the invention is to provide for greater safety in the operation of deck machinery by a reduction of shock forces on the machines and on the wires and cables controlled by the machines.

These and other objects of the invention will be apparent from the following specification and the accompanying drawings, in which.

Figure 1:
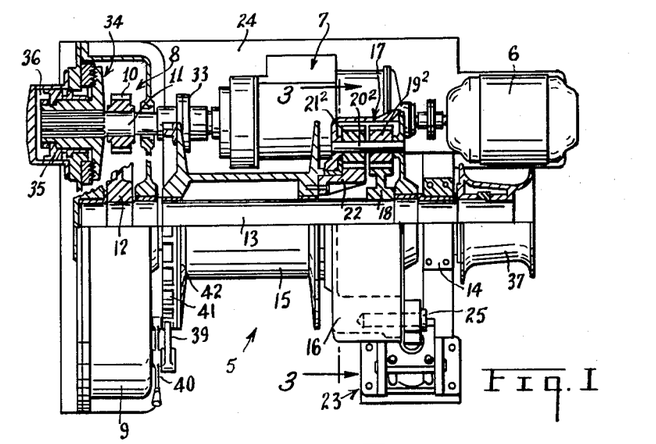
FIG. 1 is a plan view partly in section of a deck winch according to the present invention.
Figures 2, 3:
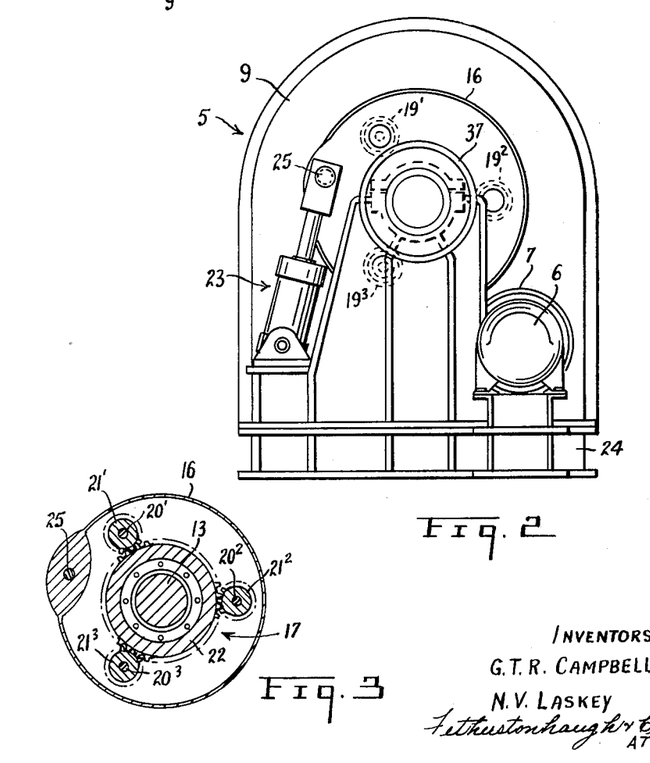
FIG. 2 is a vertical end view looking on the right hand or warping head side of the deck winch shown in FIG. 1.
FIG. 3 is a transverse vertical section on the line 3—3 of FIG. 1.
Figure 8:
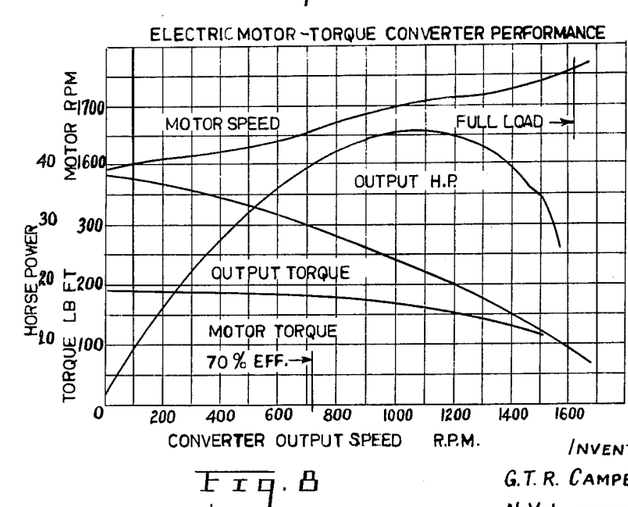
FIG. 8 is a graph showing the torque multiplying characteristics of the torque converter shown in FIG. 6.
Figure 9:
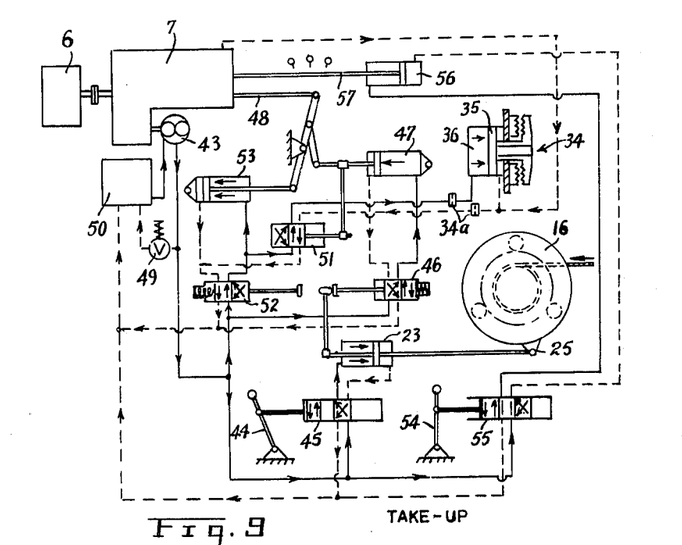
FIGS. 9, 10 and 11 are diagrams of the control mechanism for the operation of the tensioning arrangement for the deck winch shown in FIGS. 1 and 2.
Figure 10:
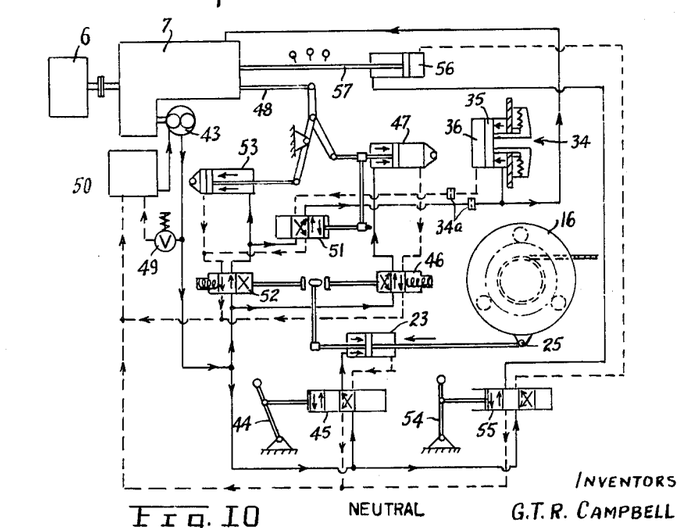
Figure 11:
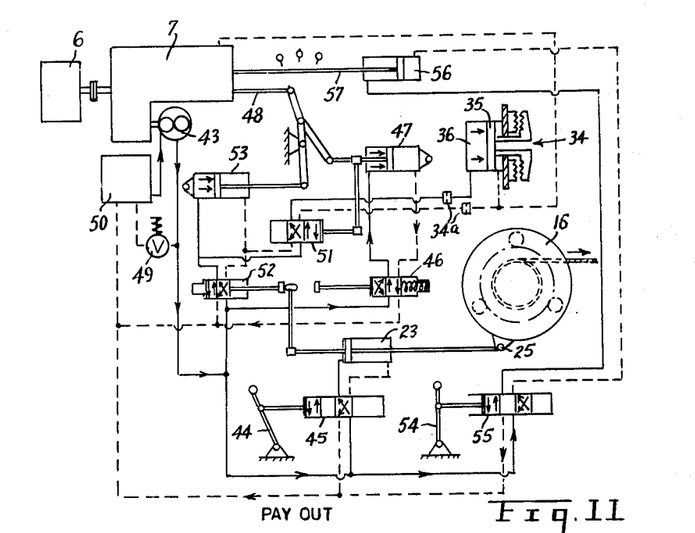

Referring to the drawings, one form of deck machinery to which the present invention is applicable is a mooring winch of the type shown in FIGS. 1 and 2 and its control mechanism is shown in FIGS. 8, 9, and 10.

The mooring winch 5 includes an A.C. electric motor 6, a torque converter/reverse reduction epicyclic gear assembly 7 connected on its input side with the electric motor 6 and on its output side with the gear train 8 within the gear casing 9. The gear train 8 may be either single or double and is here shown as a single gear train with the pinion gear 10 mounted on the shaft 11 and meshing with the gear wheel 12 secured to the output shaft 13. The shaft 13 is journalled in the gear case 9 at one end and at the other end in the pedestal bearing 14.

The wire rope barrel 15 and the casing 16 of the planetary spur gear assembly 17 is rotatably mounted on the shaft 13. A spur gear 18 is secured on the shaft 13 and engages with three planetary spur gear pinions $19^1$, $19^2$ and $19^3$ which are of equal diameter and are secured on the shafts $20^1$, $20^2$ and $20^3$ which are rotatably mounted in the casing 16. A second set of planetary spur pinions $21^1$, $21^2$ and $21^3$, also of equal size are mounted on the shafts $20^1$, $20^2$ and $20^3$. The planetary spur gears $21^1$, $21^2$ and $1^3$ in turn engage with the spur gear 22 which is spigoted and bolted to one end of the wire rope barrel 15 as seen in FIG. 1.

From the details shown in FIG. 1 it will be noted that whereas a speed increasing drive is effected in the first train 19 of the planetary gearing 17, provided the casing 16 is not allowed to rotate on its bearings, the speed increase is reduced by an equal amount in the second train 21 of the planetary gearing. The net result is that no speed reduction or increase occurs with this gearing within the casing 16.

The main objective therefore of introducing this planetary spur gear assembly 17 is to provide a measuring device for the tension in the wire rope in an automatic self-tensioning winch.

The casing 16 enclosig the planetary spur gear assembly 17 is positioned and thus prevented from rotating by the cylinder and piston device 23 which is pivotally mounted on the base 24 and is connected to the casing 16 by the pin 25.

Figure 7:
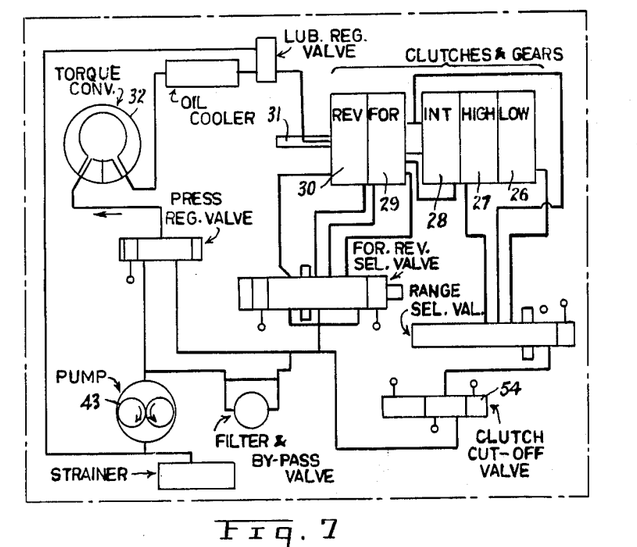
FIG. 7 is a diagram showing the hydraulic system of the torque converter-reverse reduction epicyclic gear assembly.

The torque converter/reverse reduction epicyclic gear assembly 7 is of a type similar to the "Allison Torqmatic Drive, Type CRT–3331" shown diagrammatically in FIG. 7 and includes a low-range clutch 26, a high-range clutch 27, an intermediate-range clutch 28, a forward clutch 29 and a reverse clutch 30, all connected by means 31 to the torque converter 32 and by the output flange 33 of the epicyclic gearing associated with the above clutches to the shaft 11 of the gear train 8.

An oil pressure operated multi-cone disc brake 34 is connected on one side with the shaft 11 and on its other side with the casing 9 and is operated by the piston 35 within the cylinder 36 which forms a part of the casing 9.

A warping head 37 is secured to the end of the shaft 13 outside the pedestal bearing 14. In order to use the wraping head independently of the wire rope barrel 15, the barrel is locked with the gear casing 9 by means of the pawl 39 on the lever 40 with the pawl engaging with the toothed ring 41 mounted on the flange 42 of the wire rope barrel 15.

The operation of the self-tensioning winch above described is best illustrated by reference to FIGS. 6, 8, 9 and 10.

A small hydraulic pump 43 is connected to a power takeoff point on the torque converter/reverse reduction epicyclic gear assembly 7. Thhis pump 43 is driven constantly by the A.C. electric motor 6 when the winch is in operation and provides a source of hydraulic power for operating the servo pistons actuating the directional control and the speed control spindles of the torque converter/reverse reduction epicyclic gear 7, the cylinder and piston device 23 which positions the gear case 16, and the multi-cone disc brake 34.

In order to operate this mooring winch under automatic self-tensioning duty, let us assume that the mooring wire has been paid out from the wire rope barrel and is attached to a bollard on the quay and all reference is made with regard to the control system to FIGS. 8, 9 and 10.

The main control lever 44 which operates the hydraulic valve 45 regulating admission and release of oil from the hydraulic cylinder and piston device 23, is moved from its mid position to the right in order to stroke the piston in cylinder and piston device 23 to the right. This action causes the multi-cone brake piston 35 to release the brake 34 and concurrently the direction control valve 46 is actuated. This valve 46 admits oil to the servo piston 47 which then strokes the directional control spindle 48 on the torque converter/reverse reduction gar box to the wind-in position.

The mooring winch continues to wind-in the mooring rope and tensions it to the extent which is controlled by the hydraulic pressure acting in cylinder 23. It must be remembered that the tangential tooth load between the planetary pinions $21^1$, $21^2$ and $21^3$ and gear wheel 22 and the planetary pinions $19^1$, $19^2$ and $19^3$ and the gear wheel 18 produce a turning moment about the shaft 13. For the purpose of automatic self-tensioning the mooring wire this turning moment has to be counteracted by the turning moment produced by the total force developed in cylinder 23 which also acts about the centre of shaft 13.

The winding-in proceeds to a point where the tangential tooth load between the gear teeth of the planetary pinions $19^1$, $19^2$ and $19^3$ and gear wheel 18 and the planetary pinions $21^1$, $21^2$ and $21^3$ and gear wheel 22 produces a turning moment in excess of the restraining moment produced by the cylinder and piston device 23 at which point the piston in the cylinder 23 commences to be "overhauled" to the left at which a spring loaded relief valve 49, preloaded for the tension desired in the mooring wire enables the oil contained in the cylinder and piston device 23 to be discharged back to the oil tank 50.

This return stroke of the piston in the cylinder and piston device 23 is continued until mid-stroke is reached when the multi-cone disc brake 34 is actuated and engaged by the piston 35 via the brake control valve 51. It should also be noted that the control valve 51 admits and exhausts oil from either side of the brake piston 35 through the orifice plates 34a. The servo pistons 47 and 53 actuate the clutch cut-off valve 54 (see FIG. 7) in the torque converter/reverse reduction gear box 7. The desired tension in the wire rope is therefore held by the multi-cone disc brake 34.

Should the mooring wire go slack, the piston of the cylinder and piston device 23 will move automatically to the right and commence the winding-in process in a similar fashion to that already described. For nromal operation of the mooring winch and particularly to enable it to pay out, the piston in the cylinder and piston device 23 is stroked via the control valve 45 to the left in order to operate the control valve 52 which admits oil to the servo piston 53. This servo piston 53 strokes the directional control spindle 48 and thus causes the winch to pay out.

During an emergency when a sudden surge of high order of magnitude might occur, the spring loaded relief valve 49 associated with the cylinder and piston device 23 will "blow" and allow the piston to move rapidly from its mid position to the left. In so doing, the brake 34 is released, the clutch in the torque converter/reverse reduction gear 7 becomes engaged and the directional control valve 52 is actuated. This in turn admits oil to the servo piston 53 which then strokes the directional control spindle 48 to the "wind-out" position.

When the transient peak tension condition in the mooring wire becomes relieved, the piston in the cylinder and piston device 23 will move to the right and this will stop the "winding-out" operation. When the piston on the device 23 reaches its extreme travel to the right, the winch will begin to "wind-in" and the tensioning of the wire will be effected in a manner as already described. In other words the "winding-in" will continue until equilibrium is reached again when the piston in the device 23 is returned to its mid position and the brake 34 is re-applied.

The mooring winch designed as above described enables a single warping head 37 to be mounted on the same shaft 13 as the wire rope barrel 15. This makes for a very inexpensive and compact winch.

In order to use the warping head 37 independently of the wire rope barrel 15, the barrel is locked by means of the pawl 39 to the stationary gear casing 9. The pin 25 connecting the cylinder and piston device 23 to the gear case 16 is then removed and the warping head 37 is now free to be driven by the shaft 13 quite independently of the wire rope barrel 15.

Under normal operation when the piston and cylinder device 23 is connected to the gear case 16, the warping head 37 will rotate at the same speed as the wire rope barrel 15. An additional warping head can also be located at the other end of the shaft 13 and would be arranged to protrude beyond the spur gear case 9 on that side of the winch.

The lever 54 controls a hydrulic valve 55 which actuates the servo cylinder 56 for stroking the speed control spindle 57 attached to the torque converter/reverse reduction epicyclic gear assembly 7.

In large oil tank vessels, the trend is to eliminate the stern windlass and to provide a centrally located automatic self-tensioning winch mounted with the axes of the barrel at right angles to the fore and aft centre line of the vessel. On either side of the wire rope barrel, extension shafts with warping heads are connected to couplings provided at either end of the wire rope barrel shaft.

The main advantages of the present design of automatic self-tensioning winch are as noted below and it is for these features which are considered proprietory that a patent is sought.

(1) A standard uni-directional squirrel cage A.C. electric motor can be used to power the winch. The only control equipment required is a simple starter. The elaborate, costly and difficult-to-maintain contactor gear of the A.C. motor driven winch is completely eliminated.

(2) With the use of the torque converter which provides a torque multiplication of 3.5:1, a smaller electric motor can be used than in the winch of orthodox design.

For example an automatic self-tensioning mooring winch made by a well known firm of winch manufacturers has installed a 50 H.P. electric motor while the self-tensioning capacity is declared at 22,000#. In the present design a self-tensioning capacity of 22,400# can be achieved for a power investment of 30 H.P.

(3) The cost of manufacturing such a winch is relatively low as the cost of the torque converter/reverse reduction gear box is very low in comparison with the elaborate reversible, multispeed, A.C., electric motor and its associated electrical control gear.

(4) The epicyclic gear train 17 used for measuring the rope tension is unique as it employs a compound system of planetary gears of the spur gear type unlike the more usual sun and planet gears which are more expensive to manufacture. The Almon Johnson automatic self-tensioning winch uses a standard sun and planet gear system complete with internally toothed ring gear for the mooring wire tension measuring system. This gear train is more expensive to manufacture.

(5) The casing in which the planetary gears are housed is located by a hydraulic cylinder instead of a friction brake band as in the Almon Johnson winch.

(6) The power-take-off in the torque converter/reverse reduction gear box is used to drive a hydraulic pump which is provided for powering the hydraulic cylinder which positions and locates the casing carrying the planetary gears used in the automatic self-tensioning measuring arrangement.

(7) A hydraulic cylinder is used to measure the tension in the rope which is transferred to it by the casing carrying the planetary gears.

(8) The turning moment produced by the mooring wire acting about the centre of the barrel is balanced by the opposing turning moment produced by the hydraulic cylinder which is connected to the casing carrying the planetary gears and also acts about the centre of the barrel. No springs are used as in the Almon Johnson winch.

(9) Any unbalance in these two opposing turning moments results in movement of the piston within the hydraulic cylinder used for positioning and locating the casing carrying the planetary pinions and gears. This movement is used as a signal and by means of a mechanical linkage it is employed in the control of two directional control hydraulic valves which actuate servo cylinders linked to the directional control valve in the torque converter/reverse reduction gear box. By this means which is a combination of a mechanical and a hydraulic transmission system, the winch is made to "pay-in" or "pay-out" the mooring wire in order to maintain a desired tension in the mooring wire.

(10) Adjustment and variation in mooring wire tension is not achieved by adjusting the tension of a spring as in the Almon Johnson winch. Adjustment in mooring wire tension is obtained by adjusting the loading on the relief valve connected to tthe hydraulic cylinder which locates and positions the casing carrying the planetary pinions and gears.

(11) In previous types of winches, a friction band brake is employed. The design of brake employed varies but generally a continuous brake band or brake shoes are employed to clamp on the periphery of a brake drum. When an electric motor drive is employed, brake shoes, a brake drum and an electric solenoid and spring for operating the brake is generally used. This brake is usually located between the electric motor and the gear train it drives.

In this design, a multi-cone disc type of brake which is actuated by a hydraulic cylinder is employed. The multi-cone disc brake is attached to the pinion shaft in the first spur gear train extraneous to the torque converter/reverse reduction gear box assembly. The piston which effects the application and release of the brake is controlled by a pair of directional control hydraulic valves which are actuated by the same mechanical linkage from the hydraulic cylinder which positions and locates the casing carrying the planetary pinions and gears.

(12) The control linkage is arranged so that whenever the mooring wire is at the desired tension, the brake is applied and concurrently the clutch in the torque converter/reverse reduction gear box is released. This ensures that the clutches in this gear box are never overloaded nor the gears within the epicyclic gear train directly coupled to the torque converter.

(13) With this mechanical and hydraulic control system, the self-tensioning operation of the winch is very smooth and large current surges in the electric motor are completely eliminated. The useful life of the mooring wires will undoubtedly be increased and particularly so as the difference between the "stalled" and "render" pulls in the wire rope can be controlled to a very low order of magnitude. When a number of such winches are used to moor a large vessel there should be no high transient peak loads on the shipboard electric generating plant.

(14) In the case of electric automatic self-tensioning winches which use the Ward Leonard System of Control, the light to loaded speed ratio cannot be in excess of 4:1. With this winch the light to loaded speed ratio can be as high as 8:1 in either direction.

(15) In the event of an electric power failure the mooring wire can be manually hauled off the drum. This is a very desirable feature particularly in the event of a fire aboard the tanker where in all probability the ship board power generating plant will be rendered inoperative. The mooring wire can then be released manually should it become necessary to tow the vessel away from its berth.

(16) Special note should be taken of the multi-cone disc brake used in this design of winch. This apparatus has been used very successfully as a clutch for disconnecting and engaging the drive from various types of prime movers. In this application it is used as a brake. As the multi-cone discs are located in a totally enclosed space and always provided with a copious supply of oil there should be no maintenance problem. The brake when applied will halt the winch smoothly and in the event the torque is in excess of the braking effect of the multi-cone disc the discs will operate satisfactorily under transient conditions of slippage without damage to the mating surfaces. As the discs are covered with oil within a gear case the heat generated during slippage can be dissipated without undue heating of the discs.

Figure 4:
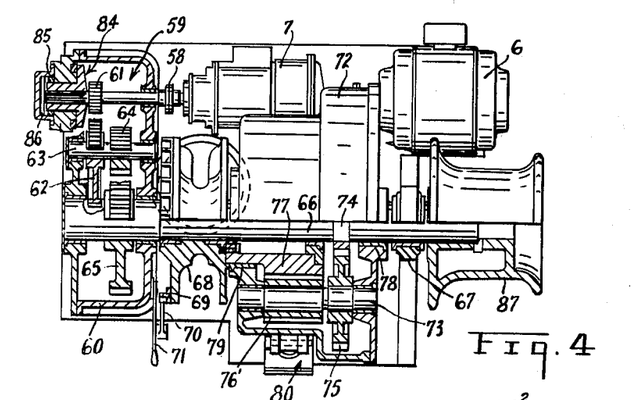
FIG. 4 is a plan view partly in section of a deck anchor windlass according to the present invention.
Figures 5, 6:
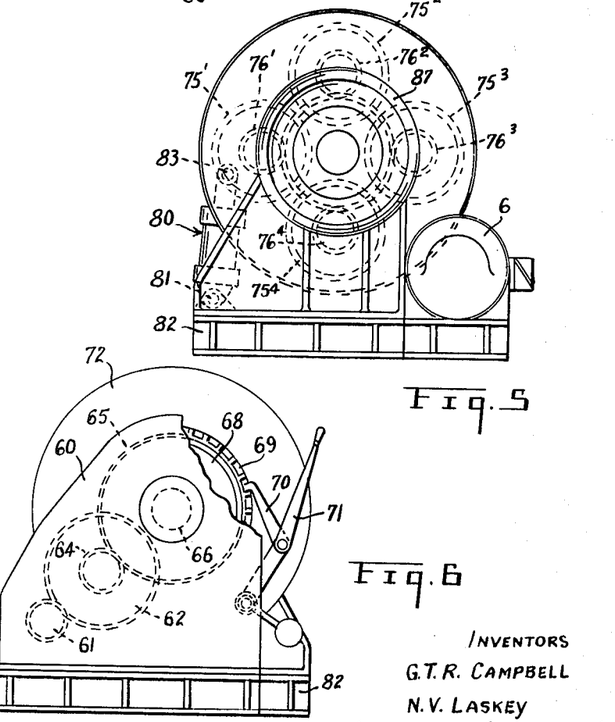
FIG. 5 is a vertical end view looking on the right hand or warping head side of the anchor windless shown in FIG. 4.
FIG. 6 is a vertical end view looking on the left hand side of the anchor windlass shown in FIG. 4 with the gear case partly broken away to show the locking pawl for securing the cable lifter.
Figure 12:
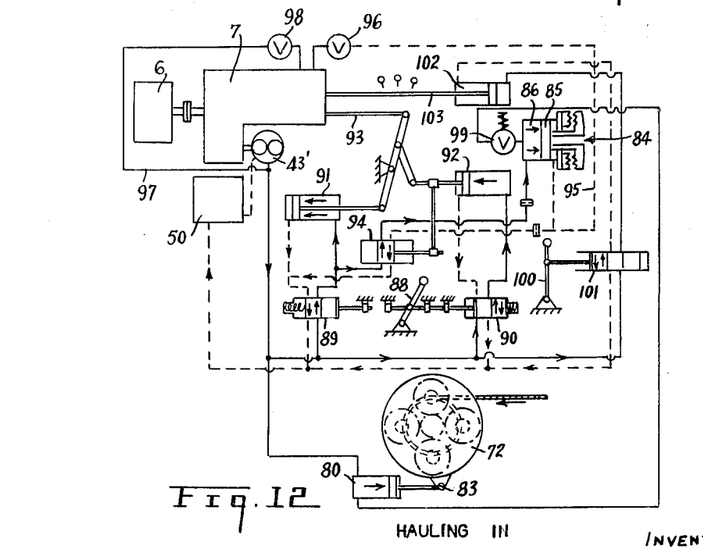
FIGS. 12, 13 and 14 are diagrams of the control mechanism for the operation of the windlass shown in FIGS. 4, 5 and 6.
Figure 13:
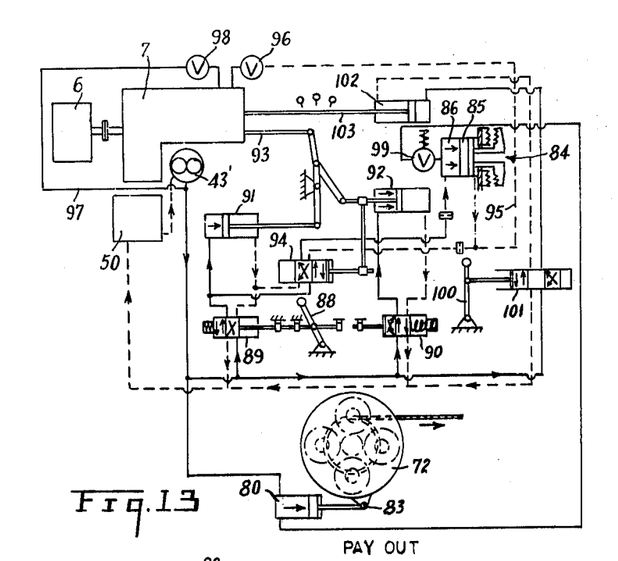
Figure 14:
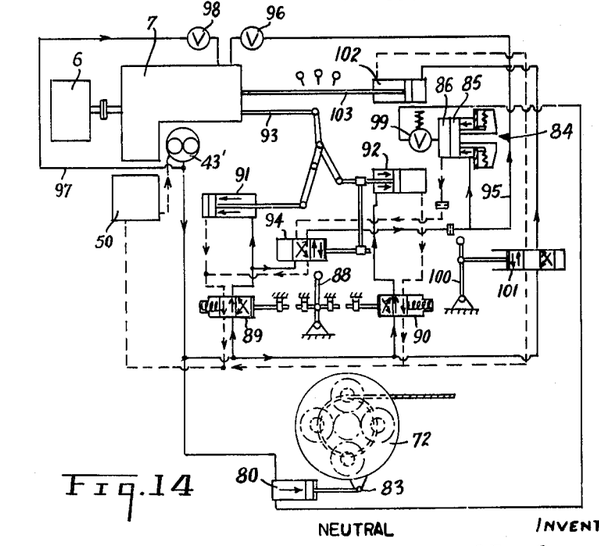

An anchor windlass incorporating the present invention is shown in FIGS. 4, 5 and 6 and the applicable controls are shown in FIGS. 12, 13 and 14.

With the steady growth in the size of dry bulk cargo vessels and oil tankers, the trend in the design of anchor windlasses for these large vessels is to separate the cable lifter and to mount and drive them independently.

Once again the problem arises with regard to the type of drive to be adopted. Only recently a reversing non-densing steam turbine has been specially developed for this purpose and which has found favour with a number of tanker shipowners. The arrangement of the drive is usually engineered around a worm and worm wheel speed reducer in association with a single or multiple spur gear train.

The problem which confronts a designer of a windlass is the high degree of speed reduction required in the gear train between the prime mover and the cable lifter as otherwise the horse power of the prime mover will be inordinately high.

By using a torque converter/reverse reduction gear box, a uni-directional prime mover can be used, besides which a torque multiplication of 3.5:1 can be achieved in the region of the stalled condition combined with the fact that an 8:1, 4:1 and a 1:1 reduction and reverse gear box is provided as well for speed and directional control. As anchor windlasses are usually provided with warping heads a high light line speed is required for warping purposes and therefore a line pull under load at an intermediate speed between the slow and light line speed is also very necessary. As the reverse reduction gear box provides three speeds clockwise and three counter-clockwise this unit is admirably suited for use in the drive of an anchor windlass.

The drive arrangement for the anchor windlass is very similar to that employed on the automatic self-tensioning mooring winch above described and so is the brake assembly. In this case the A.C. electric motor 6 drives the torque converter/reverse reduction gear assembly 7 which in turn is drivably connected to the input coupling 58 of a double spur gear train 59 within the gear casing 60. The primary reduction pinion 61 drives the primary reduction gear wheel 62 which is mounted on the same shaft 63 as the secondary reduction pinion 64. This pinion 64 is arranged to drive the secondary reduction gear wheel 65 secured on the shaft 66.

The shaft 66 is journalled in the gear casing 60 and is supported at its opposite end on the pedestal bearing 67.

The cable lifter 68 is rotatively mounted on the shaft 66 alongside the gear casing 60 and is provided with a toothed ring 69 which is engaged by the pawl 70 mounted on the hard lever 71 for the purpose of locking the cable lifter 68 to the gear case 60.

An epicyclic gear case 72 is journalled on the shaft 66, and four separate shafts 73 are journalled at spaced intervals in the gear case 72. The primary reduction pinion 74 of the epicyclic gear train is machined on the shaft 66 and engages with the four planetary gear wheels $75^1$, $75^2$, $75^3$ and $75^4$ which are mounted on the shafts 73. Four pinions $76^1$, $76^2$, $76^3$ and $76^4$ are also mounted on the shafts 73 and they engage with a central gear wheel 77 which is spigoted and bolted to the cable lifter 68. Note should be made that the epicyclic gear case 72 is mounted on two bearings 78 and 79 which are concentric with the shaft 66. As the gear case 72 is mounted on bearings it is free to rotate and in order to prevent this it is fixed by the hydraulic cylinder and piston device 80 which is pivoted at 81 to the base 82 and at the opposite end is connected to the gear case 72 by the pin 83. The cylinder and piston device 80 is used as a shock absorber in order to relieve the gear trains throughout the drive to the windlass from shock when the multicone disc brake 84 is applied by its actuating piston 85 which operates in cylinder 86 and forming part of the gear case 60. Special note should be made to the fact that the entire brake assembly 84 is within the gear case 60 and thus wear and tear in operation is greatly minimized, besides which a very positive breaking action is ensured at all times.

A warping head 87 is mounted on the shaft 66 outwardly of the pedestal bearing 67. In order to operate the warping head 87 independently of the cable lifter 68 while the cable lifter is being used for anchoring purposes, the pin 83 used for connecting the cylinder and piston device 80 to the epicyclic gear box 72, is removed, after which the warping head 87 is free to be operated in either direction quite independently of the cable lifter 68.

The operation of the control system for the windlass is illustrated in the schematic arrangements shown in FIGS. 12, 13 and 14 in which FIG. 12 shows the conditions in which the windlass is "hauling in," FIG. 13 shows the condition in which the windlass is "paying out" and FIG. 14 shows the conditions in which the windlass is in neutral.

The directional control lever 88 is used to operate the spring loaded hydraulic control valves 89 and 90 which energize the servo mechanisms 91 and 92, depending on the direction of rotation required in the cable lifter 68. These servo mechanisms 91 and 92 actuate the directional control spindle 93 in the torque converter/reverse reduction epicyclic gear assembly 7.

The hydraulic control valve 94 which services the cylinder 86 for actuation of the multi-cone disc brake 84, is connected to the linkage actuated by the servo mechanisms 91 and 92.

In this arrangement, the brake 84 is applied whenever the control lever 88 is in the neutral position.

A branch hydraulic line 95 is tapped from the brake engaging side of the piston 85 to the servo cylinder controlling the main club in the torque converter/reverse reduction epicyclic gear assembly 7. This ensures that these clutches in the torque converter/reverse reduction drive unit are always disengaged when the brake 84 is applied. An isolating valve 96 is provided in the line 95 and is to be used to disengage the drive from the torque converter/reverse reduction drive unit when the anchor and cable is dropped freely and not paid out under power. An additional branch line 97, tapped directly from the oil pump 43' discharge is also connected to the servo mechanism actuating the main clutch in the torque converter/reverse reduction epicyclic gear assembly 7. An isolating valve 98 is interposed in the branch line 97 and, when the anchor and cable is to be dropped, the valve 96 is to be closed while the valve 98 is to be opened. This disconnects the clutch in the torque converter/reverse reduction epicyclic gear assembly 7.

The cable lifter 68 can be stopped instantaneously at any time during the free fall of the anchor and chain cable by bringing lever 88 to the neutral position.

Braking of this type can not be achieved satisfactorily in the orthodox design of windlass. With the system above described a very satisfactory balance is maintained between the braking pressure applied to the multicone disc brake 84 and the pressure maintained in the cylinder 86. For example let us assume that the brake 84 has to be applied suddenly when the anchor and cable is being dropped. The cylinder and piston device 80 will absorb an excessive shock likely to be imposed on the gearing throughout the drive. This shock will cause the piston in the cylinder and piston device 80 to move to the left and the spring loaded relief valve 99 will blow and thus admit oil under relatively high pressure to the brake disengaging side of the piston 85. This will relieve the loading on the brake 84 and allow it to slip momentarily until the free fall of the anchor and cable is arrested sufficiently before final braking occurs.

The lever 100 controls a hydraulic valve 101 which actuates the servo mechanism 102 used for stroking the speed control spindle 103 attached to the torque converter/reverse reduction epicyclic gear assembly 7.

The main advantages of the present design of type of windlass are as noted below and it is for these features which are considered proprietory that a patent is sought.

(1) A standard uni-directional squirrel cage A.C. electric motor can be used to power the windlass. The only control equipment required is a simple starter. The elaborate, costly and difficult-to-maintain contactor gear of A.C. motor driven windlass is completely eliminated.

(2) With the use of the torque converter which provides a torque multiplication of 3.5:1, a smaller electric motor can be used than in the windlass of orthodox design.

(3) The cost of manufacturing such a winch is relatively low as the torque converter/reverse reduction gear box is very low in comparison with the elaborate reversible, multispeed, A.C. electric motor and its associated electrical control gear.

(4) The epicyclic gear train directly connected to the cable lifter is unique as it employs a compound system of planetary gears of the spur gear type unlike the more usual sun and planet gear which are more expensive to manufacture.

(5) The casing in which the planetary gears attached to the cable lifter are housed is located by a cylinder and piston device 76. This method of positioning the gear case of an epicyclic gear train eliminates shock loading of the gear train when braking a windlass at a time the anchor cable is allowed to fall freely.

(6) The power-take-off in the torque converter/reverse reduction gear box is used to drive a hydraulic pump which is provided for powering the hydraulic cylinder which positions and locates the casing carrying the planetary gears used as a speed reducing element as well as a means of eliminating shock to all the gear trains within the drive.

(7) The hydraulic cylinder also provides a means by which high shock loading to the chain cable can be relieved and thus prevents the likelihood, of the chain cable parting when a vessel is riding at anchor in a spur roadstead.

(8) In all windlasses a friction band brake is employed. The design of brake employed varies but generally a continuous brake band or brake shoe are employed to clamp on the periphery of a brake drum. When an electric motor drive is employed, brake shoes, a brake drum and an electric solenoid and spring for operating the brake shoes is generally used. This brake is usually located between the electric motor and the gear train it drives.

In this design, a multi-cone disc type of brake which is actuated by a hydraulic cylinder is employed. The multi-cone disc brake is attached to the pinion shaft in the first spur gear train extraneous to the torque converter/reverse reduction gear box assembly.

With this arrangement the braking of the windlass is very smooth and large current surges in the electric motor are completely eliminated. The useful life of the chain cable will undoubtedly be increased.

Special note should be taken of the multi-cone disc brake used in this design of winch. This apparatus has been used very successfully as a clutch for disconnecting and engaging the drive from various types of prime movers. In this application it is used as a brake. As the multi-cone discs are located in a totally enclosed space and always provided with a copious supply of oil there should be no maintenance problem. The brake when applied will halt the windlass smoothly and in the event the torque is in excess of the braking effect of the multi-cone disc, the discs will operate satisfactorily under transient conditions of slippage without damage to the mating surfaces. As the discs are covered with toil within a gear case the heat generated during slippage can be dissipated without undue heating of the discs.

With the above described apparatus and method of control applied to deck machinery in general and particularly to mooring winches and windlasses, a degree of automatic self-tensioning can be applied to the cables or chains operated by such machinery hitherto not obtainable by previously known machines of this type.

Such degree of self-tensioning contributes to the safety of operation of a vessel during anchoring or docking and also contributes to faster and more efficient cargo handling by deck winches.

What we claim is:

1. An automatic self-tensioning deck machine of the winch or windlass type including a barrel over which a cable is payed-out or hauled-in, means to drive the said barrel in either direction, the said drive means including an A.C. electric motor, a combined torque converter/reverse reduction clutch drive unit drivably connected with said A.C. electric motor, a main shaft on which the said barrel is rotatively mounted, a spur gear unit including a stationary casing, and an epicyclic gear unit including a casing journalled on said main shaft, the input side of said spur gear unit being drivably connected to the output side of said drive means and having its output side connected to said main shaft, the input side of said epicyclic gear unit being connected to said main shaft and having its output side connected to the said barrel, a brake operatively connected on one side with the input side of said spur gear unit and on the other side with the spur gear casing, hydraulic means connected to said epicyclic gear casing to position the said epicyclic gear casing about said main shaft, and control means controlled by said hydraulic means to regulate the drive from said drive means to said barrel and to control the engagement and disengagement of said brake, the said control means effecting engagement of the clutch in said drive means when the said brake is released.

2. An automatic self-tensioning deck machine as set forth in claim 1 in which the said brake is hyraulically operated and spring loaded relief valve associated with the said brake is pre-loaded for the desired tension on the cable passing over said barrel, the said relief valve relieving the pressure on the said brake when the tension transmitted from the barrel to the epicyclic gearing is in excess of the restraining moment on the brake.

3. An automatic self-tensioning deck machine as set forth in claim 1 in which the said brake is hydraulically operated and is automatically engaged to effect winding-in of the cable over the barrel when the said cable goes slack.

4. An automatic self-tensioning deck machine as set forth in claim 1 in which the said hydraulic means is a cylinder and piston device pivotally anchored at one end and, at the other end, is secured to the casing of the epicyclic gearing by a removable pin.

5. An automatic self-tensioning deck machine as set forth in claim 1 in which the said hydraulic means is a cylinder and piston device of which the piston is connected to the casing of the said epicyclic gearing, the said piston when moved to mid position in its cylinder by excess turning moment of said spur and epicyclic gearing in either direction, moves the said control means into a neutral position to effect disengagement of the drive from the said drive unit and simultaneously effects engagement of the said brake for holding the tension of the cable on the said barrel at a predetermined value.

6. An automatic self-tensioning deck machine as set forth in claim 1 in which the said rotatably mounted barrel is secured to the casing of the spur gearing by a manually engaged pawl.

7. An automatic self-tensioning deck machine as set forth in claim 6 in which the said main shaft is provided with a warping head, and the said barrel and the output side of the epicyclic gearing is locked to the said casing of the spur gearing by said pawl permitting the said shaft and warping head to be rotated independently of the said barrel.

8. An automatic self-tensioning deck machine as set forth in claim 1 in which the said barrel is a chain cable lifter to which the output gear of the epicyclic gearing is secured.

9. An automatic self-tensioning deck machine as set forth in claim 1 in which the said drive unit includes forward and reverse clutches and high, low and intermediate clutches and a clutch cut-off valve, and the said control means includes a valve controlling the said hydraulic means positioning the said epicyclic gear casing, and valve means operated by the position of said epicyclic gear casing for selectively engaging the forward and reverse clutches of said drive unit.

10. An automatic self-tensioning deck machine as set forth in claim 9 in which the said control means includes a brake control valve and a pair of servo mechanisms, the said servo mechanisms operating the said clutch cut-off valve to disengage the drive from said drive unit to the said barrel when the said brake is engaged and the tension in the said cable is at a predetermined value.

11. An automatic self-tensioning deck machine as set forth in claim 10 in which a relief valve is set to relieve the pressure holding the said brake engaged when the tension in the cable exceeds a predetermined value.

12. An automatic self-tensioning deck machine as set forth in claim 1 in which the said control means includes a pair of hydraulic valves individually operated by the changed position of said epicyclic gear case, a pair of servo mechanisms each operated by one of said hydraulic valves, linkage means between said servo mechanisms and said drive unit, the said servo mechanisms regulating the drive from said drive unit to the said barrel, a brake control valve admitting and exhausting hydraulic fluid to and from said brake, and linkage means between the said brake control valve and said first mentioned linkage means, the said servo mechanisms through said combined linkage means disengaging the drive from said drive unit when the said brake is engaged and the tension of the cable on the barrel is at a predetermined value.

13. An automatic self-tensioning deck machine as set forth in claim 1 in which a manually operated valve and a servo mechanism controls the speed of the drive from the said drive unit.

14. An automatic self-tensioning deck machine as set forth in claim 7 in which the said control means includes a pair of manually operated hydraulic valves, a pair of servo mechanisms each operated by one of said hydraulic valves, linkage means between said servo mechanisms and said drive unit, the said servo mechanisms regulating the drive from said drive unit to the said barrel, a brake control valve admitting and exhausting hydraulic fluid to and from said brake, and linkage means between said brake control valve and said first mentioned linkage means, the said servo mechanisms through said combined linkage means disengaging the drive from said drive unit when the said brake is engaged and the tension of the cable on the barrel is at a predetermined value.

15. An automatic self-tensioning deck machine as set forth in claim 14 in which a manually operated valve and a servo mechanism controls the speed of the drive from the said drive unit.

16. An automatic self-tensioning deck machine as set forth in claim 14 in which valve means between the said brake and the clutches of the said drive unit, effects disengagement of the drive from the said unit when the chain on the cable lifter is to be dropped freely.

17. An automatic self-tensioning deck machine as set forth in claim 14 in which a hand lever controls the said hydraulic valves, the said lever in one position effecting haul-in drive of the cable lifter and in the opposite position effecting payout of the cable lifter, and in the neutral position effecting disconnection of the drive from the said drive unit and engagement of the said brake.

References Cited by the Examiner

FOREIGN PATENTS 1,134,598    10/1955    France.
882,084    11/1961    Great Britain.

EVON C. BLUNK, *Primary Examiner.*

SAMUEL F. COLEMAN, *Examiner.*

H. C. HORNSBY, *Assistant Examiner.*